(12) United States Patent
Bennett

(10) Patent No.: US 7,499,444 B2
(45) Date of Patent: Mar. 3, 2009

(54) METHOD FOR CLOCK SYNCHRONIZATION OF WIRELESS 1394 BUSES FOR NODES CONNECTED VIA IEEE 802.11 A/B WLAN

(75) Inventor: Jeff Bennett, Briarcliff Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 407 days.

(21) Appl. No.: 10/561,474

(22) PCT Filed: Jun. 24, 2004

(86) PCT No.: PCT/IB2004/051004

§ 371 (c)(1),
(2), (4) Date: Dec. 20, 2005

(87) PCT Pub. No.: WO2004/114563

PCT Pub. Date: Dec. 29, 2004

(65) Prior Publication Data

US 2007/0110023 A1    May 17, 2007

Related U.S. Application Data

(60) Provisional application No. 60/482,654, filed on Jun. 26, 2003.

(51) Int. Cl.
*H04J 3/06* (2006.01)
*H04B 7/212* (2006.01)
*H04B 7/00* (2006.01)
*H04Q 7/20* (2006.01)

(52) U.S. Cl. ................ 370/350; 370/503; 370/324; 455/502; 455/507

(58) Field of Classification Search ............ 370/350
See application file for complete search history.

(56) References Cited

U.S. PATENT DOCUMENTS 5,408,506 A * 4/1995 Mincher et al. ............ 375/134

6,347,084 B1   2/2002   Hulyalkar
6,914,895 B1 * 7/2005   Straub et al. ............... 370/350
7,120,092 B2 * 10/2006   del Prado Pavon et al. .... 368/46

(Continued)

FOREIGN PATENT DOCUMENTS

WO    WO 99/55028    10/1999
WO    WO 01/43317 A2    6/2001

OTHER PUBLICATIONS

NEC: NEC Develops World's First Prototype IEEE 1394 Switch LSI for Home Networks; M2 Presswire; Aug. 3, 2000; p. 1.*

*Primary Examiner*—Nick Corsaro
*Assistant Examiner*—Tangela T Chambers
(74) *Attorney, Agent, or Firm*—Larry Liberchuk

(57) ABSTRACT

A method and apparatus for providing clock synchronization of 1394 buses having wireless devices utilizing 802.11 communication with computers attached to one or more 1394 buses, include the steps of synchronizing an internal time base of a wireless master device attached to a first bus by receiving a Software Beacon Alert that indicates a time of a subsequent transmission, and applying the Software Beacon Alert to a first phase-lock loop circuit associated with the master device to create a filtered Software Beacon Alert. The first phase-lock loop circuit is unsymmetrical about zero error. A timing message is transmitted from the master device to a second phase-lock loop circuit associated with at least one slave device. The timing message must be sent to the at least one slave device before the master device receives a subsequent Software Beacon Alert message, so that the wireless master device and the at least one slave device are synchronized, even though they are on different buses. This invention allows 1394 devices having wireless means to communicate over an 802.11 Wireless Local Area Network (WLAN) network, so that communications can be synchronized between the master and slave device across 1394 serial buses.

17 Claims, 2 Drawing Sheets

U.S. PATENT DOCUMENTS

| | | | |
|---|---|---|---|
| 2002/0018458 A1* | 2/2002 | Aiello et al. | 370/348 |
| 2003/0014682 A1* | 1/2003 | Schmidt | 713/500 |
| 2003/0169774 A1* | 9/2003 | Del Prado Pavon et al. | 370/503 |
| 2003/0207697 A1* | 11/2003 | Shpak | 455/524 |
| 2004/0008661 A1* | 1/2004 | Myles et al. | 370/350 |
| 2004/0218580 A1* | 11/2004 | Bahl et al. | 370/350 |
| 2005/0025117 A1* | 2/2005 | Inagaki et al. | 370/350 |
| 2005/0073991 A1* | 4/2005 | Roberts et al. | 370/350 |

* cited by examiner

METHOD FOR CLOCK SYNCHRONIZATION OF WIRELESS 1394 BUSES FOR NODES CONNECTED VIA IEEE 802.11 A/B WLAN

CROSS REFERENCE TO RELATED APPLICATION

This application claims the benefit of U.S. provisional application Ser. No. 60/482,654 filed Jun. 26, 2003, which is incorporated herein in whole by reference.

The field of the invention relates to the synchronization of devices specified in standards such as IEEE 1394. More particularly, the present invention relates to the synchronization of IEEE 1394 devices connected via 802.11a or 802.11b wireless standards.

IEEE 1394 is a standard for a serial bus wherein the devices are normally connected via a serial cable. For example, a camcorder, camera, or monitor can be connected with a first computer via a 1394 bus. The first computer will in all likelihood have a 1394 adapter card plugged into one of its slots to control and translate communications between the 1394 devices and the computer.

However, with the advent of 802.11 radio, it is possible to have in a single device, such as computer, an 802.11 adapter card and a 1394 card that permits control of devices, for example, such as a camera, camcorder, monitor, etc. Another computer can communicate with the first computer, and if it is desired, for example, the images captured by the camera can be sent to the second computer. In order to send the images to the second computer, the camera will transfer image data along the 1394 wired bus to the first computer. With the advent of wireless communication, particularly Wireless Local Area Network (WLAN) such as 802.11a or 802.11b (hereinafter "802.11a/b") increases the possibility for this particular method of communication to be used for communication between the first and second computers.

In order for 1394 devices attached to a 1394 bus to communicate with other 1394 devices on another bus via wireless communication such as 802.11, most of the 1394 standards must be replicated in order to provide full 1394 functionality. The synchronization of devices conventionally connected is specified in the IEEE 1394 standard, and a method for achieving this function in the European wireless standard entitled "Hiperlan" in ETSI TS 101 493-3.

However, there is no known method for synchronizing 1394 devices on different hardwired buses that attempt communication over 802.11a/b.

The synchronization issue is critical because devices using the 1394 standard use a synchronous system for timing. Although the 802.11a/b standards have a beacon, transmitted at regular intervals, the transmission or reception of this beacon is not directly accessible outside the 802.11a/b device. A computer does have access to the Software Beacon Alert (SBA). This alert is an indication from the 802.11a/b device that the beacon will be transmitted shortly and that software must prepare the beacon data. In addition, this alert can not be used directly for synchronization since it has a large (100 us is not unusual) variability in delay from the 802.11a/b timebase. The target beacon transition time (TBTT) is used in 802.11 by the Point Coordinator (PC) to let devices know what is the time space between transmitted frames, with time being divided into repeated periods called superframes. A superframe begins with a beacon frame that permits the delivery of protocol parameters and allows for synchronization of the local timers in the stations. Thus, every station connected in the 802.11 network knows when the next beacon frame will arrive, which is announced in the beacon frame.

802.11a/b both utilize beacons transmitted at a constant rate, but the 802.11a/b is a non-synchronous protocol. Further complicating the problem is that the 802.11 is essentially divided into an adapter card (having the radio) and the computer to which it is connected (having the "smarts" necessary for control), and the card must generate an interrupt to be serviced by the computer.

Thus, the need exists to provide an accurate (i.e. clean) wall clock that could be used by the all the 802.11a/b devices to permit communication of devices attached on different 1394 buses.

The present invention provides a method and apparatus for synchronizing 1394 devices that connect via an 802.11a/b WLAN.

According to a first aspect of the present invention, a first step of a two-step process that utilizes a first Phase Lock Loop (PLL) is used to provide a clean wall clock that can be used to synchronize the communications of the 1394 buses.

According to a second aspect of the present invention, a second step of a two step process is to transfer the cycle time information from a first 1394 bus 205 (shown in FIG. 2) to computer slave devices 210b and 210c, where the computer slave device 210b contains a second PLL.

Thus, the present invention permits synchronizing an internal time base to the SBA, and using the time base to synchronize 1394 buses.

According to the present invention, a digital phase lock loop (PLL) can be employed to provide a synchronization of the 802.11 devices attached to respective 1394 buses with the following difference: the phase gain is not symmetrical about zero error.

Figure 1:
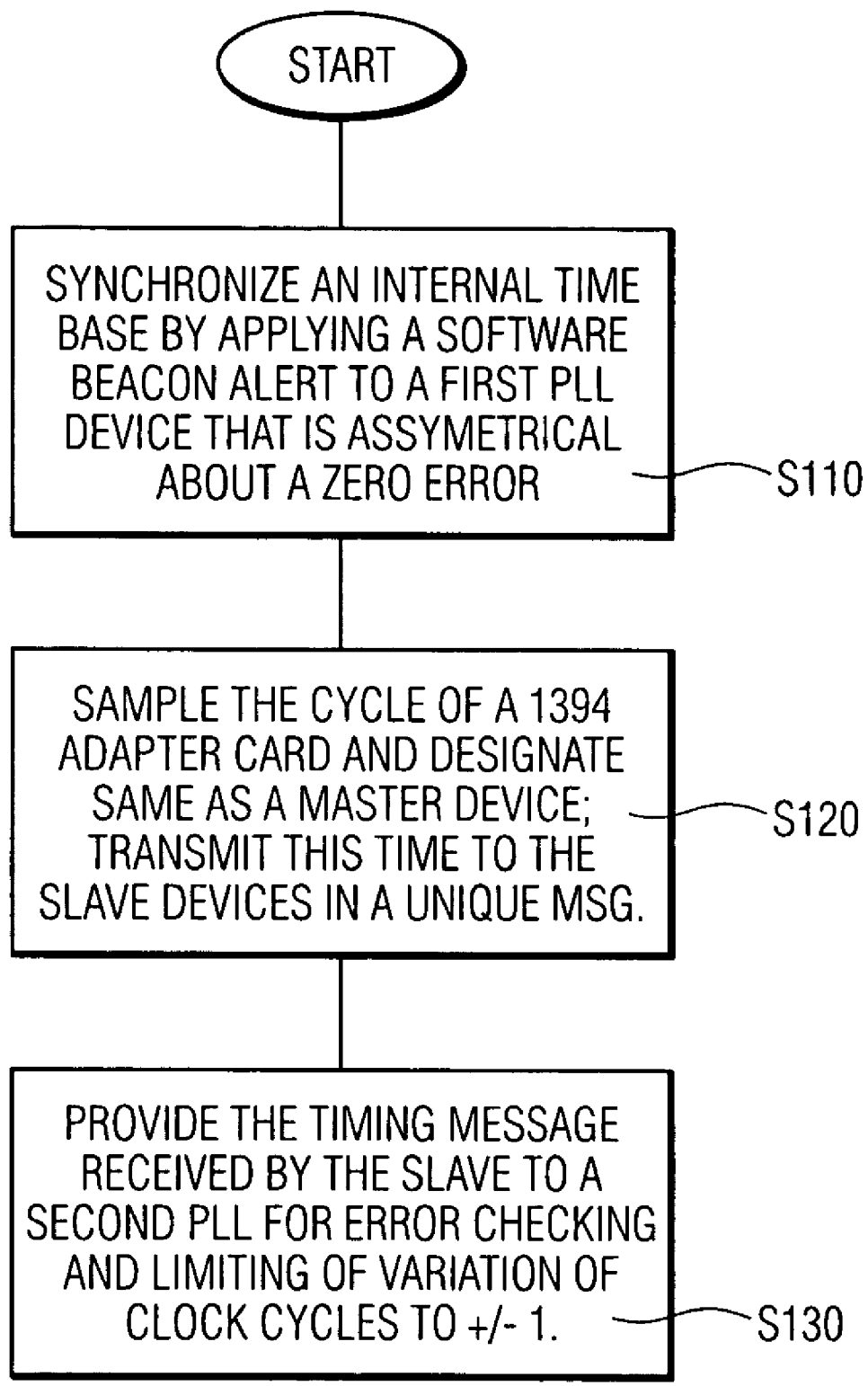
FIG. 1 is a flowchart providing an overview of an aspect of the present invention.

FIG. 1 illustrates an overview of a method according to the presenting invention. The process comprises two steps.

At step 110 an internal time base is synchronized to the Software Beacon Alert by applying the Software Beacon Alert to a first phase-lock loop (PLL) circuit that is unsymmetrical about zero error. The phase gain as used is typically not a straight line (linear) gain throughout. For example, a gain that is a small and constant value indicates a late beacon. However, a gain that is a large and proportional (linear) indicates that the beacon is early.

The Software Beacon Alert provides the time of the next beacon frame, which is referred to as target beacon transition time (TBTT). However, as previously disclosed, the Software Beacon Alert often incurs delays, which makes it unsuitable as a timing reference by itself. The time variation of the Software Beacon alert is almost always delayed to some degree. The present invention compensates for the time variation of the Software Beacon Alert by utilizing a PLL having a phase detector gain that is constant and small when the Software Beacon Alert is late, but large and proportional when the Software Beacon alert is early. This function is implemented identically on all wireless 1394 devices connected to the bus, giving them all a common, stable time base, by which to synchronize device hardwired to different buses.

At Step 120, the synchronized internal time base, which has been synchronized to the time of the Software Beacon Alert, is used to sample the cycle time of a 1394 adapter card of one of the computers and designate that particular card to be the cycle master. The cycle master samples the 1394 timebase in response to the filtered Software Beacon Alert. The master then transmits this time to all other wireless 1394 devices in a unique message. The time that it takes to transmit this time to the other devices is not critical, so long as it is transmitted by the next Software Beacon Alert since the time it was acquired is known to all wireless 1394 devices.

At step 130, the remaining devices, which are slaves, apply the timing messages received from the master to a second PLL. This use of a second PLL allows for error checking and limits the instantaneous change in the 1394 cycle time to a +/−1 clock per 1394 cycle. The slave devices 210b, 210c each have their own PLL circuit 225 (not shown) but arranged similar to that of the first PLL 225 of the master device 210a. It should be noted that the typical error between the master and slave only will be a portion of one clock per 1394 cycle. The PLL on the slaves must account for this error and distribute it evenly over many 1394 cycles. For example, a slave whose 24.576 MHz clock is a ½ clock per cycle slow would mean that every other cycle comprises 3071 clocks instead if the normal 3072.

Figure 2:
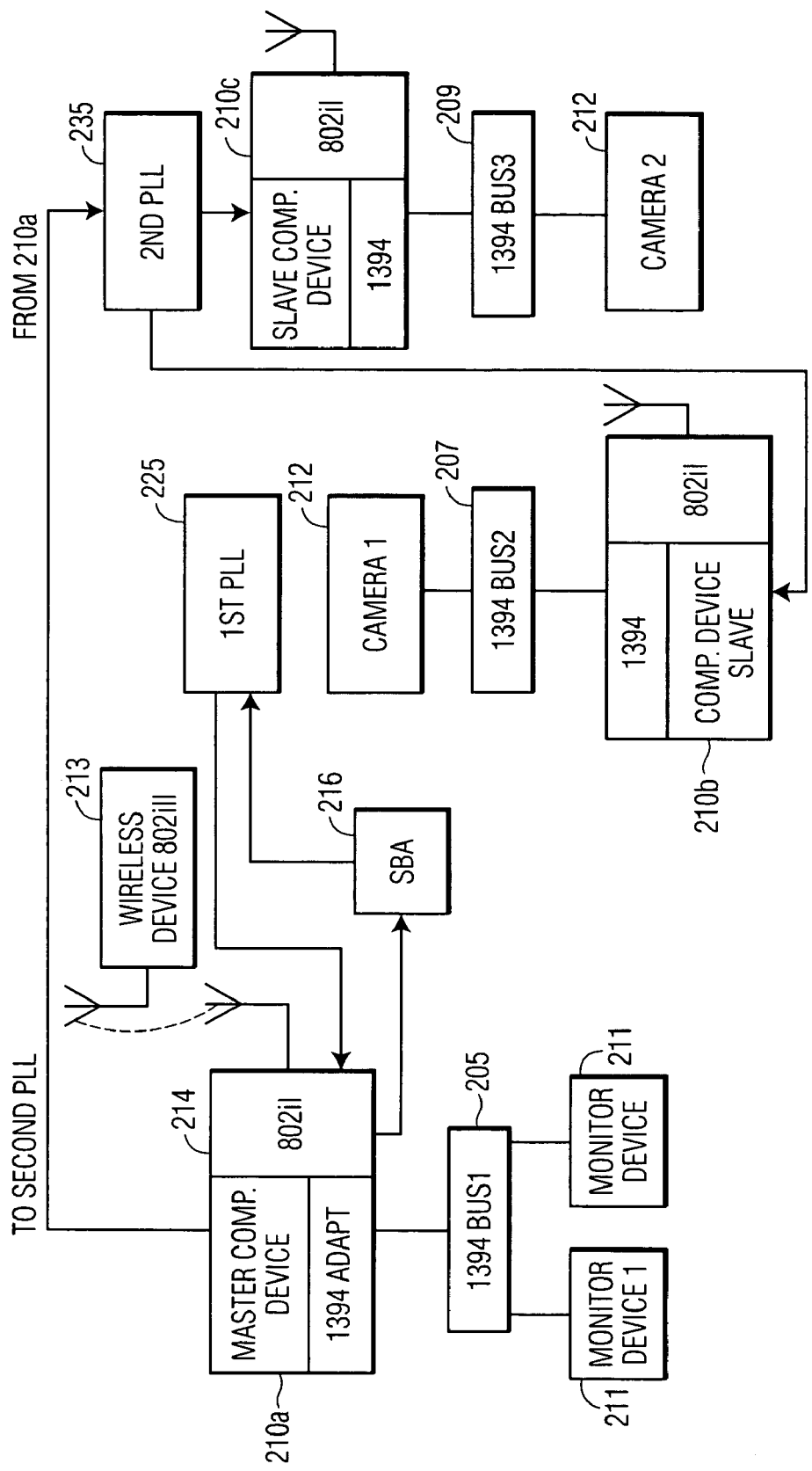
FIG. 2 shows one way that an apparatus according to the present invention can be arranged.

FIG. 2 illustrates one way that a wireless system according to the present invention can be arranged. The buses 205, 207, 209 are 1394 buses. Devices 210a, 210b, 210c, are typically computers with 1394 adapter cards. The computers also have means for wireless communication 214 with WLAN devices 213, such as cameras 212, telephones (not shown), monitors 211, etc. In the present example, it is presumed that the wireless standard is 802.11, but other wireless forms of communication can be used.

Device 210a is designated as the master device, and devices 210b and 210c are the slave devices. The first phase-locked loop (PLL) 225 receives the Software Beacon Alert 216. The first PLL 225 is preferably a digital PLL that is not symmetrical about zero error. The gain of first PLL 225 is constant and small when the Software Beacon Alert is later than the announced arrival, but is large and proportional when the Software Beacon Alert is early. This function is implemented identically on all 1394 wireless devices, giving them a common, stable time base. The slave devices, 210b and 210c apply the time messages received from the master to the second PLL 235. The second PLL 235 checks for the error on the master and distributes the error over many 1394 cycles.

Thus, all the 802.11a/b devices are synchronized to the same 1394 master device, even though they are connected to different buses. Every time a filtered interrupt occurs, the cycle time can be read out. Typically there is about 1 ms to transfer the reading from the 802.11 cards. This reading is used on the next software alert. The slave side gives us a delta reading in addition to the delta reading from the master 1394 card, which allows the determination as to whether or not the timing is fast or slow. A standard PLL can be used to determine this timing, by comparing the cycle time with a local cycle time. Thus, the difference in timing can be corrected over a predetermined period of time to get the phase correct.

Various modifications can be made to the present invention that would not depart from the spirit of the invention, or the scope of the appended claims. It should be understood that the illustrations were provided for explanatory purposes and not to limit the claimed invention. Although the examples shown used computers having 1394 adapter cards and 802.11 cards to communicate with other wireless devices, it is possible that other types of devices can be attached to the 1394 bus, and the types of wireless device can be anything that can communicate with the device attached to the 1394 bus.

The invention claimed is:

1. A method for clock synchronization of a plurality of wireless devices that are in communication with respective nodes, wherein at least some of the respective nodes are attached to different buses, comprising:

synchronizing an internal time base of a wireless master device attached to a first bus by receiving a Software Beacon Alert that indicates a time of a subsequent transmission and applying the Software Beacon Alert to a first phase-lock loop circuit associated with the master device to create a filtered Software Beacon Alert, wherein said first phase-lock loop circuit uses a phase detector with an asymmetrical gain about zero error;

receiving a timing message transmitted from the master device on the first bus to a second phase-lock loop circuit associated with at least one slave device attached to a second bus; and providing the timing message from the second phase-locked loop to said at least one slave device attached to said a second bus before the master device receives a subsequent Software Beacon Alert message, so that the wireless master device and the at least one slave device are synchronized.

2. The method according to claim 1, wherein the timing message received is error checked.

3. The method according to claim 2, wherein an instantaneous change in cycle time for the at least one slave device is limited to +/− one clock pulse per 1394 cycle.

4. The method according to claim 1, wherein the messages transmitted and received between the wireless master device and the at least one slave device utilize an 802.11 WLAN network.

5. The method according to claim 1, further comprising:

determining whether the Software Beacon Alert is late or early by determining an output of the first phase lock loop circuit, wherein a constant value that is small relative to a predetermined value indicates that the Software Beacon Alert is late, whereas a relatively larger and proportional gain of the first phase lock loop circuit indicates that the Software Beacon Alert is early.

6. A system for clock synchronization of wireless nodes, comprising:

a master device attached to a first bus having means for receiving a Software Beacon Alert and means for communication with at least one wireless device, said Software Beacon Alert providing an indication of a time of a subsequent transmission;

a first phase-lock loop device in communication with the master device, said first phase-lock loop device being unsymmetrical about zero error so that a phase detector gain is constant and relatively smaller when the Software Beacon Alert is later than an indicated subsequent transmission time, and relatively larger and proportional when the Software Beacon Alert is earlier than the indicated subsequent transmission time, said first phase locked-loop providing a filtered Software Beacon Alert message;

at least one slave device that receives the filtered Software Beacon Alert message transmitted by the master device; said at least one slave device includes means for wireless communication with at least one wireless device; and a second phase-lock loop device that is in communication with the at least one slave device, said second phase-lock loop device is unsymmetrical about zero error so that a phase detector gain is constant and relatively smaller when the filtered Software Beacon Alert message is later than the indicated subsequent transmission time, and relatively larger and proportional when the Software Beacon Alert message is earlier than the indicated subsequent transmission time, so that said master device of the first bus and said at least one slave device of a second bus are synchronized.

7. The system according to claim 6, wherein the filtered Software Beacon Alert message received by the second phase-lock loop device is error checked.

8. The system according to claim 7, wherein an instantaneous change in cycle time for the filtered Software Beacon Alert message of said at least one slave device is +/− one clock cycle.

9. The system according to claim 8, wherein the messages transmitted and received between a first wireless device in communication with the master device and a second wireless device in communication with at least one slave device utilize an 802.11 WLAN network.

10. The system according to claim 6, wherein the master device and the at least one slave device conform to the IEEE 1394 device timing standards, and said master device and said at least one slave device are connected to respective 1394 serial buses.

11. The system according to claim 10, further comprising a plurality of IEEE 1394 serial buses, with said master device being attached to a first of the plurality of IEEE serial buses and said slave device being attached to a second of the plurality of IEEE 1394 buses.

12. An apparatus for receiving a Software Beacon Alert from a wireless network and synchronizing a plurality of wireless nodes, said apparatus comprising:

means for synchronizing a Software Beacon Alert that indicates a subsequent transmission time including a phase-lock loop filter that is unsymmetrical about zero error, so that a phase detection gain is constant and relatively smaller when the Software Beacon Alert (SBA) is later than the indicated subsequent transmission time, and larger and proportional when the SBA is earlier than the indicated subsequent transmission time, said means for synchronizing providing a filtered Software Beacon Alert;

a master-slave arrangement wherein a master device transmits a filtered Software Beacon Alert to at least one slave device; and wherein each of said master device and at least one slave device are attached to a respective 1394 serial buses, and each of said master and the at least one slave device having wireless communication with an 802.11 capable wireless device; and a second phase-lock loop filter device for said at least one slave device that performs error checking.

13. The apparatus according to claim 12, wherein the second phase-lock loop filter device limits an instantaneous change to +/− one clock cycle.

14. The apparatus according to claim 12, wherein the second-phase lock loop filter device distributes an instantaneous change over a plurality of cycles.

15. The apparatus according to claim 12, comprising at least an additional second phase-lock loop device so that each respective slave device has a respective second phase-lock loop device.

16. The apparatus according to claim 12, wherein said wireless device communicating with said master device and the at least one slave device communicate via an IEEE 802.11 protocol.

17. The apparatus according to claim 12, wherein the master device and the at least one slave device comprise computers having 1394 adapter cards to communicate with a 1394 serial bus, and 802.11 adapter cards for wireless transmission with 802.11 devices.

* * * * *